(12) United States Patent
Miyamoto

(10) Patent No.: US 12,204,210 B2
(45) Date of Patent: Jan. 21, 2025

(54) LIQUID CRYSTAL MODULE

(71) Applicant: Sharp Display Technology Corporation, Kameyama (JP)

(72) Inventor: Hirofumi Miyamoto, Kameyama (JP)

(73) Assignee: Sharp Display Technology Corporation, Mie (JP)

( * ) Notice: Subject to any disclaimer, the term of this patent is extended or adjusted under 35 U.S.C. 154(b) by 0 days.

(21) Appl. No.: 18/396,984

(22) Filed: Dec. 27, 2023

(65) Prior Publication Data

US 2024/0255821 A1 Aug. 1, 2024

(30) Foreign Application Priority Data

Feb. 1, 2023 (JP) ................. 2023-014280

(51) Int. Cl.
*G02F 1/1345* (2006.01)
*G02F 1/1333* (2006.01)
*G02F 1/1368* (2006.01)

(52) U.S. Cl.
CPC ........ *G02F 1/13452* (2013.01); *G02F 1/1345* (2013.01); *G02F 1/13454* (2013.01); *G02F 1/133302* (2021.01); *G02F 1/133305* (2013.01); *G02F 1/1368* (2013.01)

(58) Field of Classification Search
None
See application file for complete search history.

(56) References Cited

U.S. PATENT DOCUMENTS 9,177,904 B2 * 11/2015 Jung ................. H10K 59/179
2018/0107317 A1    4/2018 Tanaka et al.
2018/0121013 A1 *  5/2018 Yun .................. G06F 3/04164

FOREIGN PATENT DOCUMENTS

JP       2018-063666 A    4/2018

* cited by examiner

*Primary Examiner* — Dung T Nguyen
(74) *Attorney, Agent, or Firm* — ScienBiziP, P.C.

(57) ABSTRACT

A liquid crystal module includes a liquid crystal display panel including a TFT substrate having a main surface including a display region and a non-display region located around the display region, a control device including a rigid substrate and a timing controller mounted on the rigid substrate, and a flexible circuit substrate having one end coupled to a mounting region in the non-display region and the other end coupled to the rigid substrate. The flexible circuit substrate is bent, and the rigid substrate is supported on the TFT substrate in the mounting region.

6 Claims, 6 Drawing Sheets

LIQUID CRYSTAL MODULE

BACKGROUND

1. Field

The present disclosure relates to a liquid crystal module.

2. Description of the Related Art

A liquid crystal module is widely used in various applications. In a specific application, such as a mobile terminal, there is a demand for a case where a picture-frame of a display device into which a liquid crystal module is built is narrow and a thickness of the display device is required to be reduced. For example, Japanese Unexamined Patent Application Publication No. 2018-63666 discloses a method for manufacturing a liquid crystal display device having a structure in which a liquid crystal substrate and a bus circuit board need not be coupled to each other, and an area of an outer edge of the liquid crystal display panel is as small as possible.

SUMMARY

It is desirable to provide a liquid crystal module in which a picture-frame of a display device is narrow and a thickness of the display device can be reduced.

A liquid crystal module according to an aspect of the present disclosure includes a liquid crystal display panel that includes a TFT substrate having a main surface including a display region and a non-display region located around the display region and including a plurality of pixels arranged two-dimensionally in the display region, a counter substrate disposed to face the main surface of the TFT substrate, and a liquid crystal layer disposed between the TFT substrate and the counter substrate, a control device that includes a rigid substrate having a first side and a second side facing each other and having no flexibility and includes a timing controller mounted on the rigid substrate, and a flexible circuit substrate that has a first end and a second end, has flexibility, and protrudes outside the rigid substrate, the first end being coupled to a vicinity of the first side of the rigid substrate, in which the TFT substrate has a third side and a mounting region that is adjacent to the third side in the non-display region and not covered with the counter substrate, the second end of the flexible circuit substrate is coupled to a vicinity of the third side in the mounting region of the TFT substrate, the flexible circuit substrate is bent between the first end and the second end, and a vicinity of the second side of the rigid substrate is supported by the mounting region.

DESCRIPTION OF THE EMBODIMENTS

Figure 1:
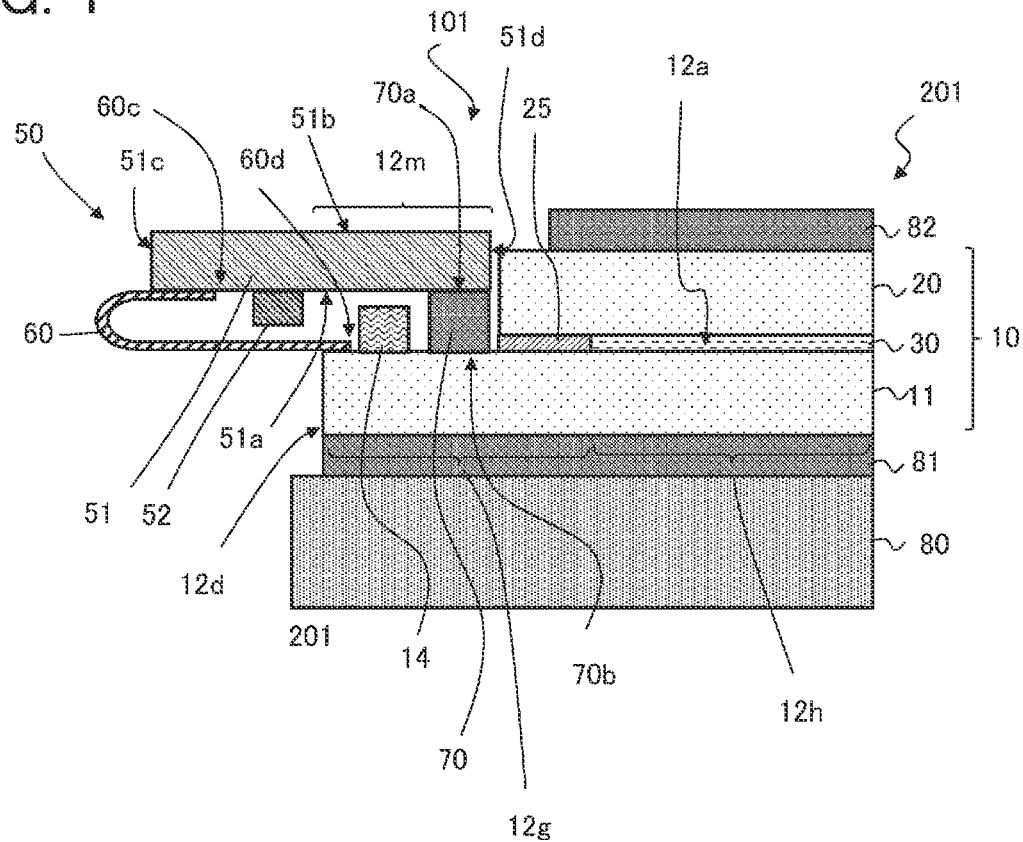
FIG. 1 is a schematic view illustrating a cross-section of a part of a liquid crystal display device and a liquid crystal module according to a first embodiment.

Hereinafter, embodiments of the present disclosure will be described based on the drawings. The present disclosure is not limited to the following embodiments, and appropriate design changes can be made within the scope of satisfying a configuration of the present disclosure. In addition, in the following description, the same reference numerals are used for the same portions or portions having the same function in common in different drawings, and iteration descriptions thereof will be omitted. In addition, each configuration described in the embodiments and modification examples may be appropriately combined or changed without departing from the gist of the present disclosure. In order to make the descriptions easier to understand, in the drawings referred to below, the configuration is illustrated in a simplified or schematic form, or some configuration members are omitted. In addition, a dimensional ratio between the configuration members illustrated in each drawing does not necessarily indicate an actual dimensional ratio.

First Embodiment

FIG. 1 is a schematic view illustrating a cross-section of a part of a liquid crystal display device 201 and a liquid crystal module 101 according to the present embodiment. The liquid crystal display device 201 includes the liquid crystal module 101, polarizing plates 81 and 82, and a backlight 80. The liquid crystal module 101 includes a liquid crystal display panel 10, a control device 50, and a flexible circuit substrate 60. The liquid crystal display panel 10 includes a TFT substrate 11, a counter substrate 20, and a liquid crystal layer 30.

Figure 2:
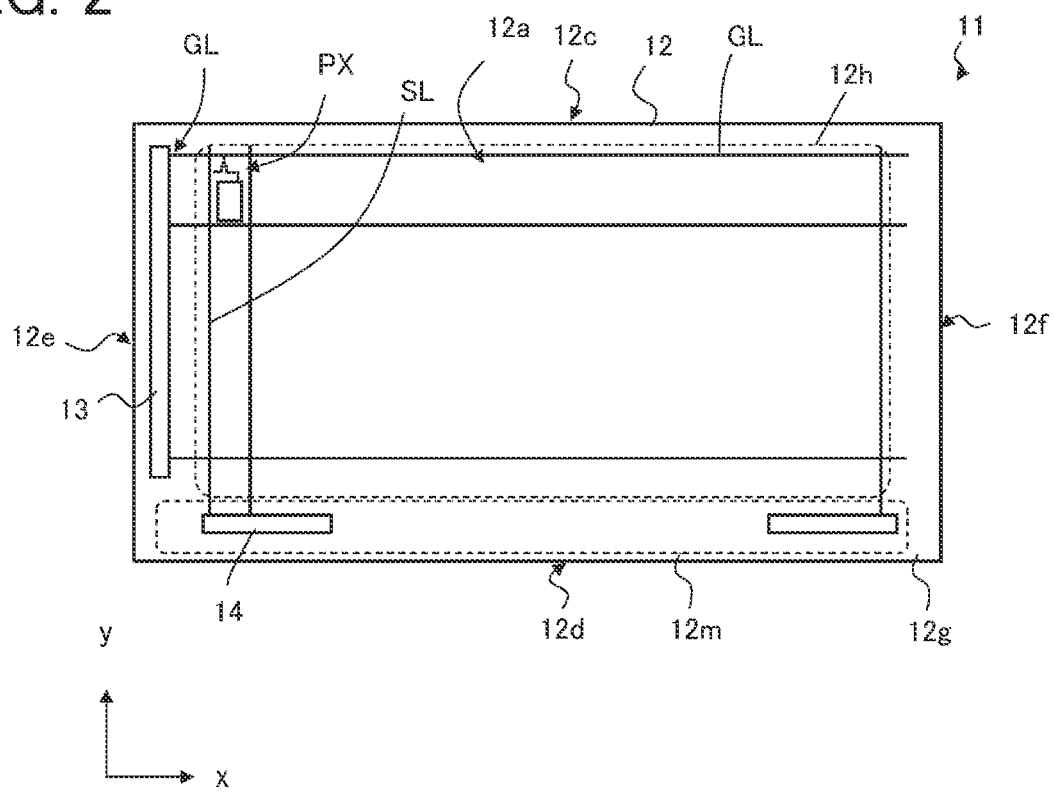
FIG. 2 is a schematic view illustrating a configuration of a TFT substrate.

FIG. 2 is a schematic diagram illustrating a configuration of the TFT substrate 11. The TFT substrate 11 includes a substrate 12, a plurality of source bus lines SL, a plurality of gate bus lines GL, and a plurality of pixels PX.

The substrate 12 has, for example, a rectangular shape including a side 12c and a side (third side) 12d facing each other, and a side 12e and a side 12f facing each other. In addition, the substrate 12 has a main surface 12a including a display region 12h and a non-display region 12g located around the display region 12h. The non-display region 12g includes a mounting region 12m adjacent to the side 12d.

The substrate 12 is, for example, a light-transmitting substrate, such as a glass substrate or a resin substrate.

The plurality of gate bus lines GL, the plurality of source bus lines SL, and the plurality of pixels PX are disposed in the display region 12h. Specifically, the plurality of gate bus lines GL extend in an x-axis direction and are disposed at predetermined intervals in a y-axis direction. The plurality of source bus lines SL extend in the y-axis direction and are disposed at predetermined intervals in the x-axis direction. The pixel PX is disposed in a region surrounded by a pair of adjacent gate bus lines GL and a pair of adjacent source bus lines SL. The plurality of pixels PX are arranged two-dimensionally in the x-axis direction and the y-axis direction. The source bus line SL and the gate bus line GL extend to the non-display region 12g.

Figure 3:
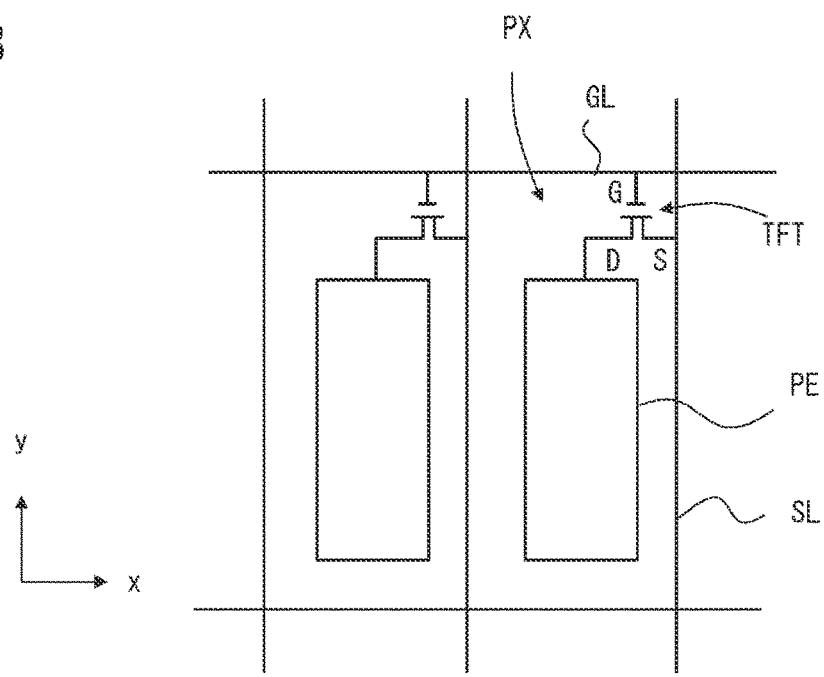
FIG. 3 is a schematic circuit diagram illustrating a configuration of a pixel.

FIG. 3 is a schematic circuit diagram illustrating a configuration of the pixel PX. The pixel PX includes a pixel electrode PE and a TFT. A gate electrode G of the TFT is coupled to the gate bus line GL, a source electrode S is coupled to the source bus line SL, and a drain electrode D is coupled to the pixel electrode PE.

Each of the gate bus lines GL is coupled to the gate electrode G of the TFT of the pixel PX arranged in the x-axis direction among the plurality of pixels PX. Each of the source bus lines SL is coupled to the source electrode S of the TFT of the pixel PX arranged in the y-axis direction among the plurality of pixels PX.

As illustrated in FIG. 2, at least one gate driver 13 and at least one source driver 14 are disposed in the non-display region 12g of the substrate 12. For example, the gate driver 13 is disposed in a region adjacent to the side 12e of the non-display region 12g, and is coupled to one end of each of the plurality of gate bus lines GL.

The source bus line SL is disposed in the mounting region 12m adjacent to the side 12d of the non-display region 12g and is coupled to the source driver 14. As illustrated in FIG. 1, the mounting region 12m is not covered with the counter substrate 20.

The gate driver 13 may be configured with, for example, a plurality of TFTs and monolithically formed on the substrate 12. Alternatively, the gate driver 13 is an IC having a resin-sealed package shape or a bare chip and may be mounted on the substrate 12. The source driver 14 is an IC having a resin-sealed package shape or a bare chip and may be mounted on the substrate 12.

As illustrated in FIG. 1, the counter substrate 20 is disposed to face the main surface 12a of the TFT substrate 11, and the liquid crystal layer 30 is disposed between the counter substrate 20 and the TFT substrate 11. For example, a color filter, a common electrode, and the like are disposed on the counter substrate 20. The color filter and the common electrode may be disposed on the TFT substrate 11. A seal 25 is disposed between the counter substrate 20 and the TFT substrate 11 to surround the liquid crystal layer 30.

The polarizing plate 81 and the polarizing plate 82 are disposed to sandwich the liquid crystal display panel 10 so as to cover at least the display region 12h. The backlight 80 is disposed adjacent to the polarizing plate 81.

The control device 50 receives an image signal from a host apparatus including an arithmetic device, such as a CPU or a GPU, generates a gate signal and a display data signal, and outputs the generated signals to the gate driver 13 and the source driver 14 of the liquid crystal display panel 10. In the liquid crystal module of the present embodiment, the control device 50 is supported on the TFT substrate 11, and thereby, a picture-frame of a display device can be narrowed and a thickness can be reduced. Hereinafter, a structure and disposition of the control device 50 will be described with reference to FIGS. 1, 4A, and 4B.

Figure 4A:
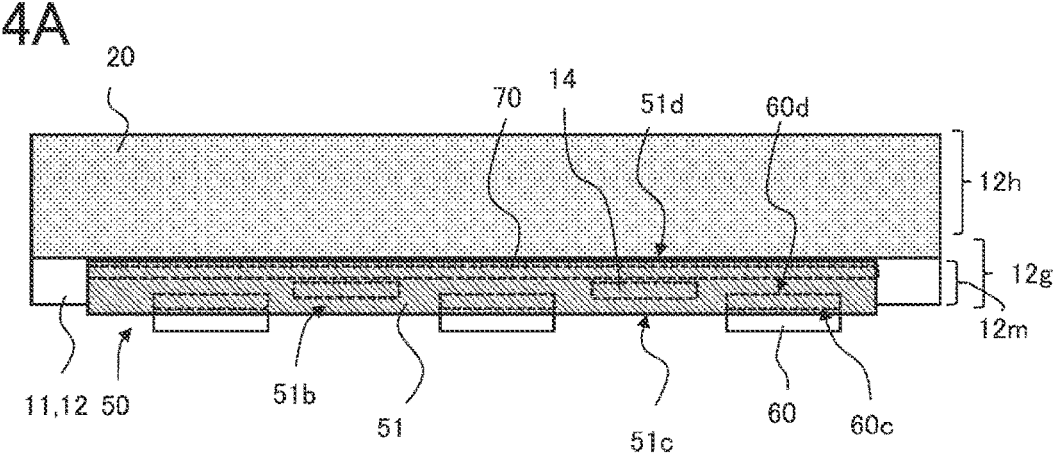
FIG. 4A is a schematic plan view of a part of a liquid crystal module according to the first embodiment.
Figure 4B:
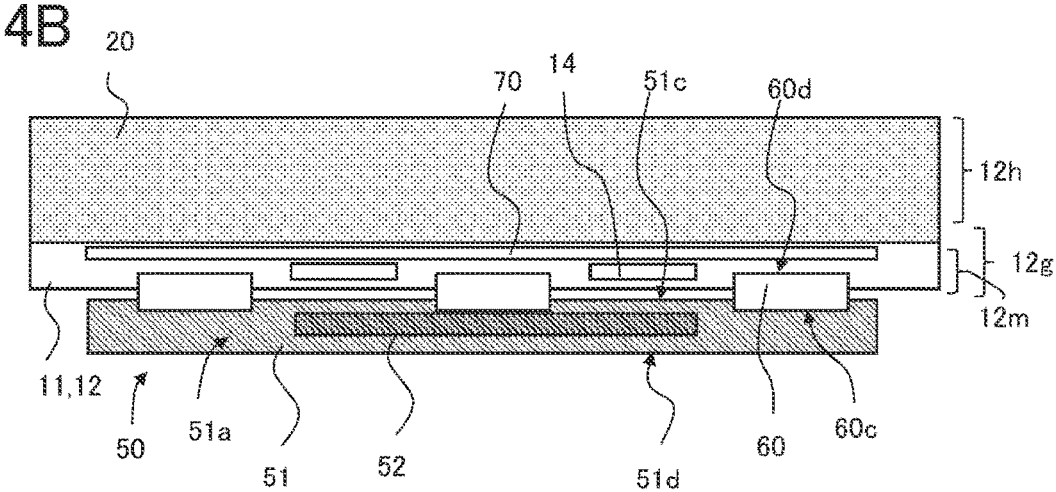
FIG. 4B is a schematic plan view of the liquid crystal module according to the first embodiment before a control device is supported on the TFT substrate.

FIG. 4A is a schematic plan view of a part of the liquid crystal module 101, and FIG. 4B is a schematic plan view of the liquid crystal module 101 before the control device 50 is supported on the TFT substrate 11. In FIGS. 4A and 4B, some of components are indicated by oblique lines, mesh, or the like corresponding to FIG. 1 for easy understanding. Hereinafter, the same applies to the corresponding drawings. The control device 50 includes a rigid substrate 51 and a timing controller 52.

The rigid substrate 51 is a printed circuit board formed of a resin, such as polyimide or epoxy, and does not have flexibility. The rigid substrate 51 is formed of a material different from the material of the substrate 12 that constitutes the TFT substrate 11. The rigid substrate 51 has a main surface 51a, a main surface 51b located on an opposite side of the main surface 51a, and a side (first side) 51c and a side 51d facing each other. The rigid substrate 51 is, for example, a general circuit substrate called a PCB and includes one or a plurality of layers on which conductive circuit patterns are formed. The timing controller 52 is mounted on a main surface 51a of the rigid substrate 51.

The flexible circuit substrate 60 includes one or a plurality of layers on which conductive circuit patterns are formed and has flexibility. In addition, the flexible circuit substrate 60 has a first end 60c and a second end 60d.

The first end 60c of the flexible circuit substrate 60 is coupled to the vicinity of the side 51c on the main surface 51a of the rigid substrate 51. In the examples illustrated in FIGS. 4A and 4B, three flexible circuit substrates 60 are coupled to the rigid substrate 51.

The second end 60d of the flexible circuit substrate 60 is coupled to the vicinity of the side 12d in the mounting region 12m of the TFT substrate 11. As illustrated in FIG. 1, a coupling position of the second end 60d is closer to the side 12d than a position at which the source driver 14 is mounted in the mounting region 12m.

As illustrated in FIGS. 1 and 4A, the flexible circuit substrate 60 is bent between the first end 60c and the second end 60d. The flexible circuit substrate 60 may be bent so as not to be folded. As a result, a part of the rigid substrate 51 is located above the mounting region 12m of the TFT substrate 11, and the vicinity of the side 51d of the rigid substrate 51 is supported by the mounting region 12m. The rigid substrate 51 may be coupled to the TFT substrate 11 at a position farther from the side 12d than a position to which the second end 60d of the flexible circuit substrate 60 is coupled. The main surface 51a of the rigid substrate 51 faces the TFT substrate 11.

The liquid crystal module 101 may further include a coupling member 70 such that the source driver 14 mounted on the TFT substrate 11 does not interfere with the control device 50 and the rigid substrate 51. The coupling member 70 has an upper surface 70a and a lower surface 70b, and the upper surface 70a is coupled to the vicinity of the side 51d of the main surface 51a of the rigid substrate 51. In addition, the lower surface 70b is coupled to the mounting region 12m of the TFT substrate 11. The coupling member 70 has a height greater than a height of the source driver 14. Accordingly, the source driver 14 may not come into contact with the rigid substrate 51.

As long as the coupling member 70 has the height described above, the coupling member 70 may be, for example, a double-sided tape in which a base material portion is thick and the upper surface 70a and the lower surface 70b have adhesiveness. Alternatively, the coupling member 70 may have a structure in which a double-sided tape is disposed on a base material portion having no adhesiveness and on the upper surface 70a and the lower surface 70b.

According to the liquid crystal module 101 and the liquid crystal display device 201, a part of the rigid substrate 51 of the control device 50 is disposed above the mounting region 12m exposed from the counter substrate 20 of the liquid crystal display panel 10. The mounting region 12m is an indispensable region for disposing the source driver 14 or for disposing a wiring pattern for coupling the gate driver 13, the source driver 14, and the flexible circuit substrate 60 to each other. By using a space above the mounting region 12m for disposing the control device 50, the non-display region 12g of the liquid crystal module 101 and the liquid crystal display device 201 can be effectively used, and a portion of the control device 50 protruding from the non-display region 12g of the TFT substrate can be reduced.

In addition, since the mounting region 12m is not covered with the counter substrate 20, a space in a thickness direction of the liquid crystal module 101 and the liquid crystal display device 201 is also effectively used by disposing a part of the control device 50 above the mounting region 12m.

Therefore, according to the present embodiment, there is provided a liquid crystal module in which a picture-frame of a display device is narrow and a thickness of the display device can be reduced.

Figure 5:
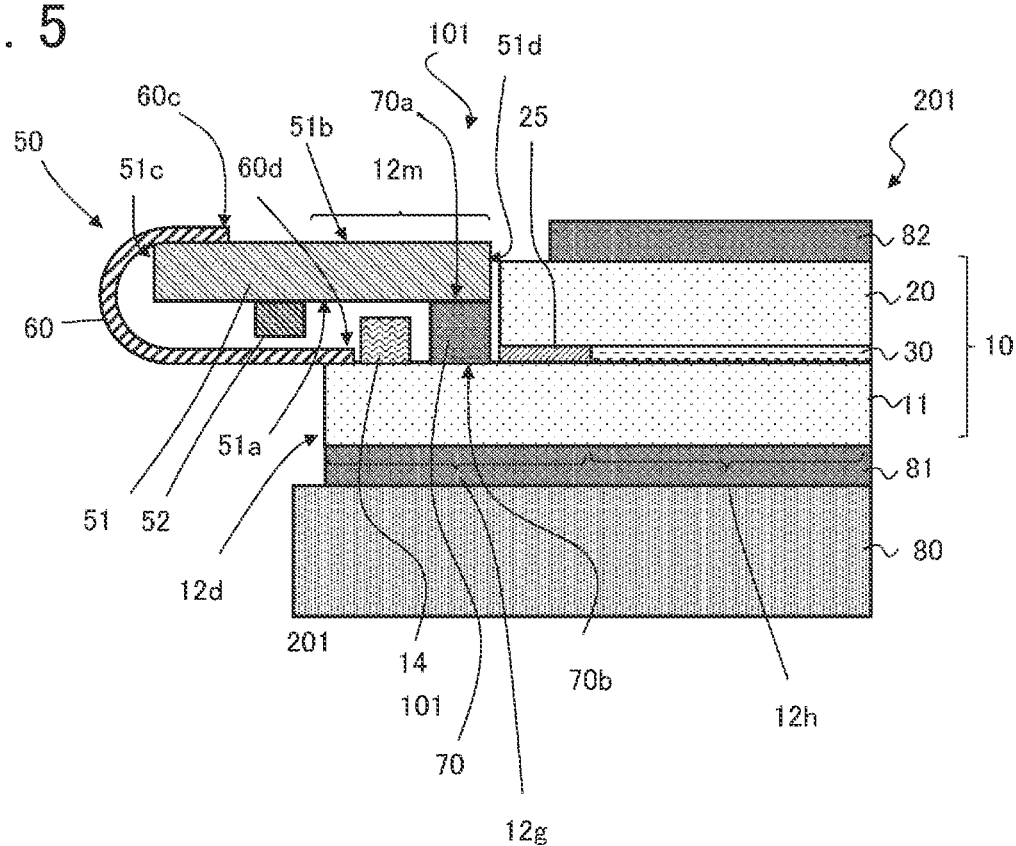
FIG. 5 is a schematic view illustrating a cross-section of a part of a liquid crystal display device and a liquid crystal module according to another aspect of the first embodiment.

In the present embodiment, the timing controller 52 is mounted on the main surface 51a of the rigid substrate 51, but the timing controller 52 may be mounted on the main surface 51b. In addition, as illustrated in FIG. 5, the first end 60c of the flexible circuit substrate 60 may be coupled to the main surface 51b of the rigid substrate 51, that is, a surface that does not face the TFT substrate 11.

Second Embodiment

Figure 6A:
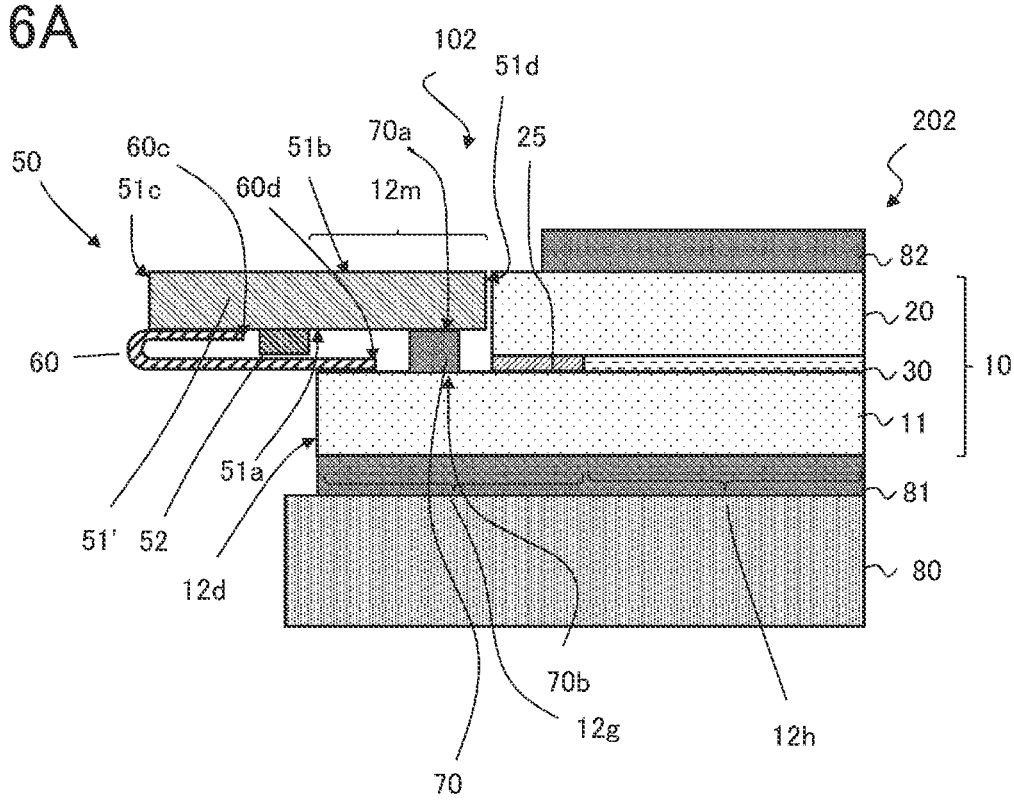
FIG. 6A is a schematic view illustrating a cross-section of a part of a liquid crystal display device and a liquid crystal module according to a second embodiment.
Figure 6B:
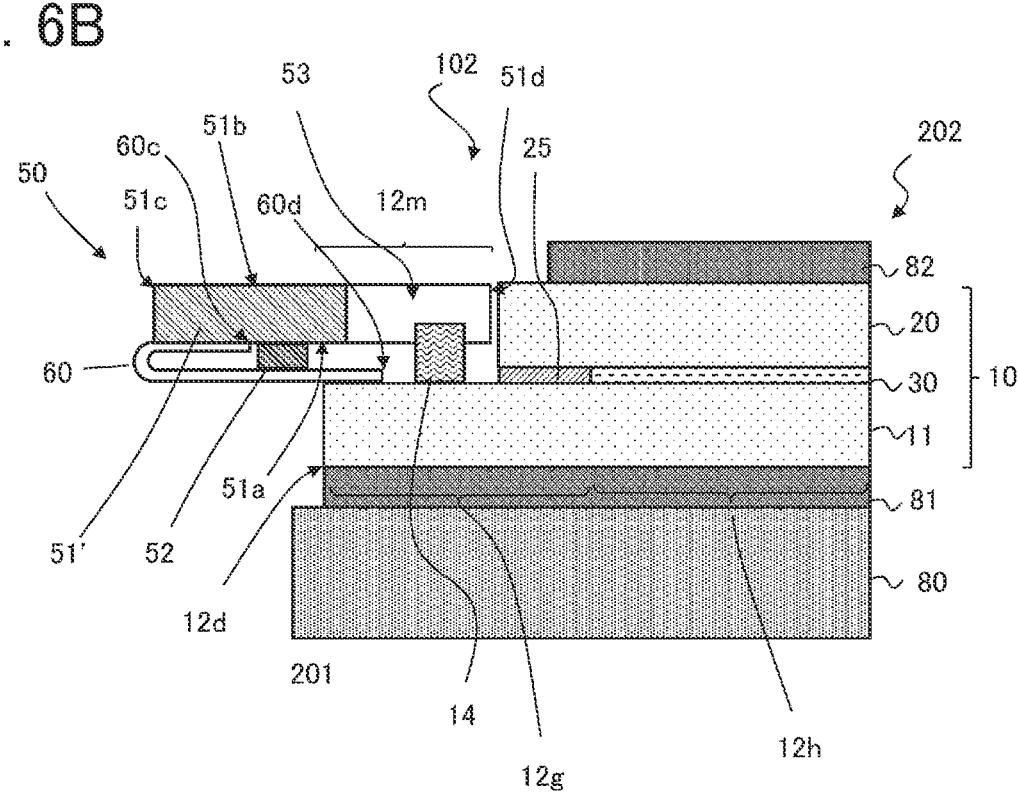
FIG. 6B is a schematic view illustrating a cross-section of a part of the liquid crystal display device and the liquid crystal module according to the second embodiment.
Figure 7A:
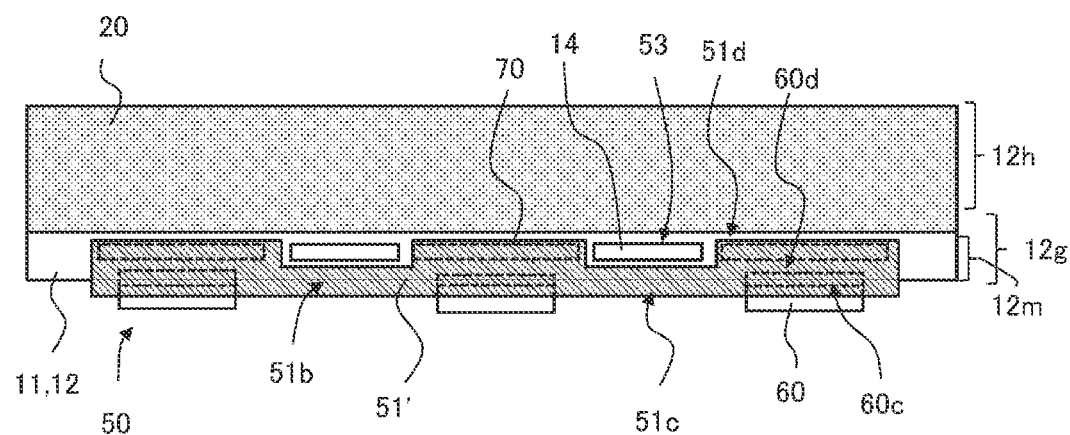
FIG. 7A is a schematic plan view of a part of a liquid crystal module according to the second embodiment.
Figure 7B:
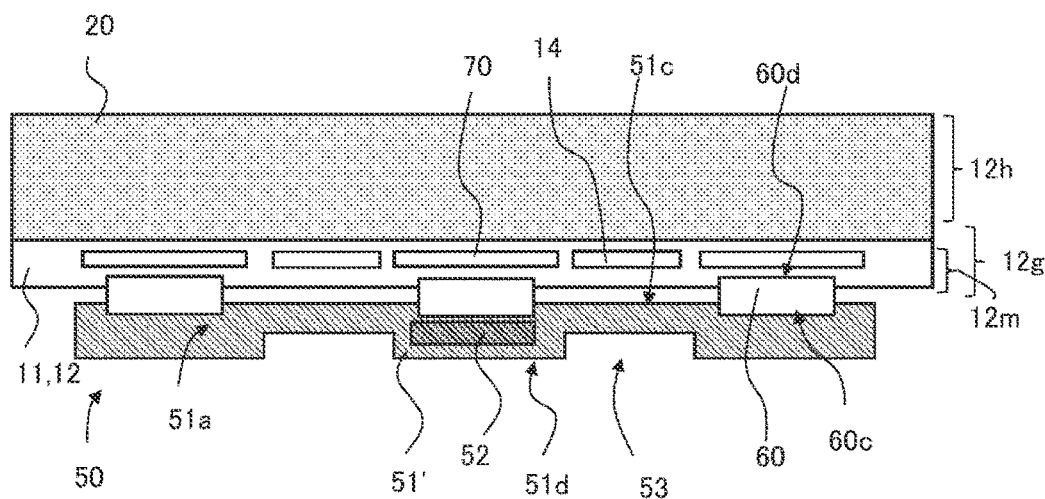
FIG. 7B is a schematic plan view of the liquid crystal module according to the second embodiment before a control device is supported on a TFT substrate.

FIGS. 6A and 6B are schematic views illustrating cross-sections of parts of a liquid crystal display device 202 and a liquid crystal module 102 according to the present embodiment. FIG. 7A is a schematic plan view of a part of the liquid crystal module 102, and FIG. 7B is a schematic plan view of the liquid crystal module 102 before the control device 50 is supported on the TFT substrate 11. The liquid crystal display device 202 and the liquid crystal module 102 of the present embodiment are different from the liquid crystal display device 201 and the liquid crystal module 101 of the first embodiment in that a rigid substrate 51' of the control device 50 has at least one notch 53 in a side 51d.

In a state where the vicinity of the side 51d of the rigid substrate 51' is supported by the mounting region 12m, the notch 53 is at a position corresponding to the source driver 14 mounted on the TFT substrate 11, and at least a part of the source driver 14 is inserted into a space of the notch 53. Accordingly, interference between the source driver 14 and the rigid substrate 51' of the control device 50 is suppressed, and a height of a coupling member 70 can be reduced. Accordingly, a position of the rigid substrate 51' in the height direction can be lowered, and a thickness of a display device can be reduced.

In the present embodiment, the rigid substrate 51' of the control device 50 has the notch 53 but may have an opening instead of the notch 53.

Third Embodiment

Figure 8:
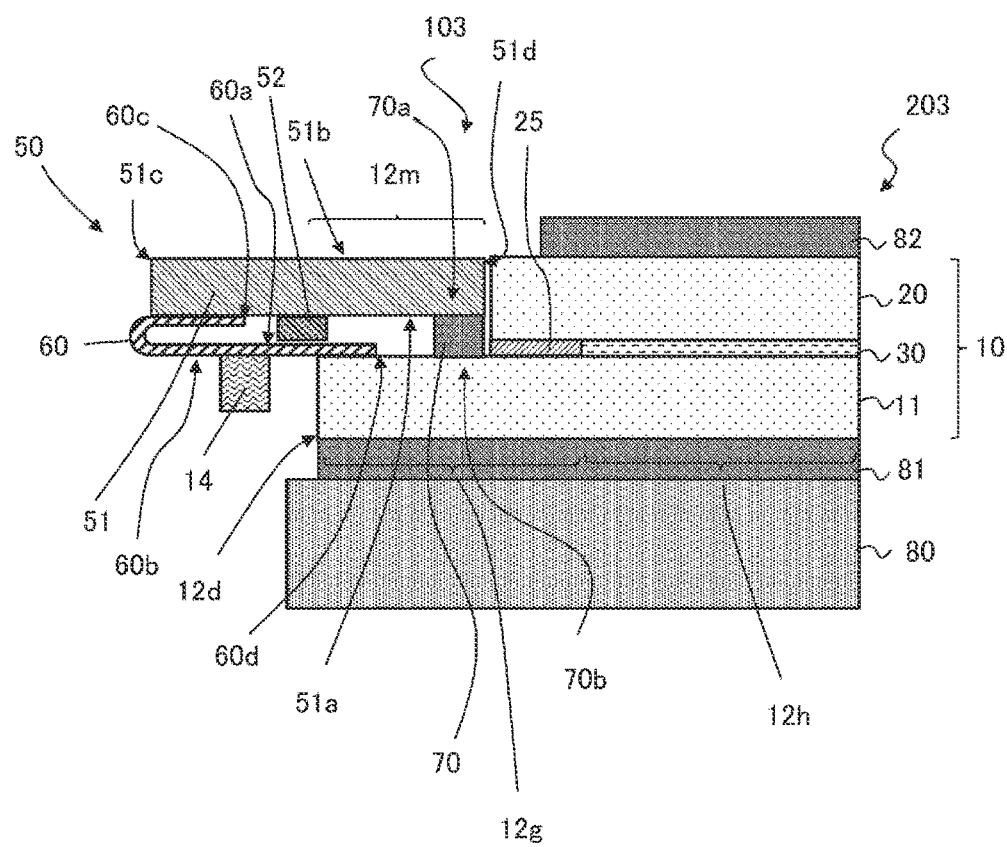
FIG. 8 is a schematic view illustrating a cross-section of a part of a liquid crystal display device and a liquid crystal module according to a third embodiment.
Figure 9A:
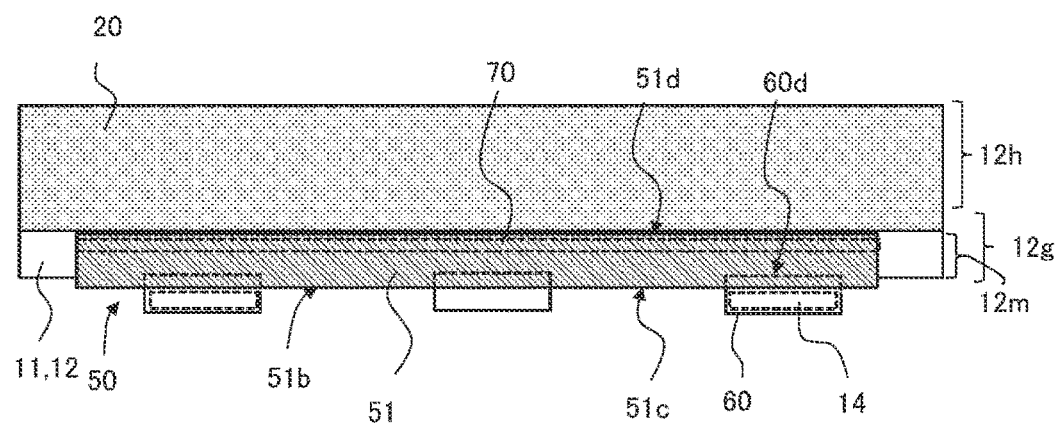
FIG. 9A is a schematic plan view of a part of a liquid crystal module according to the third embodiment.
Figure 9B:
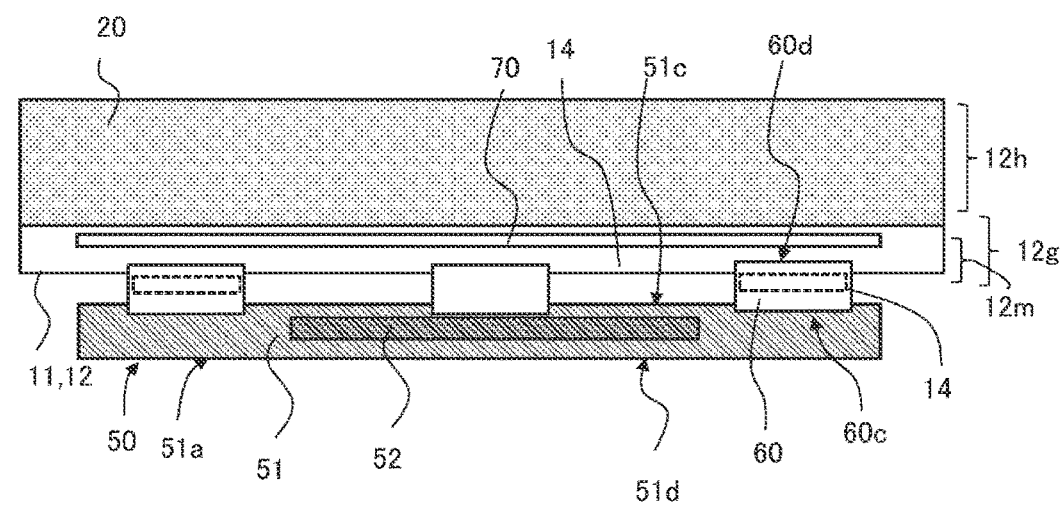
FIG. 9B is a schematic plan view of the liquid crystal module according to the second embodiment before a control device is supported on a TFT substrate.

FIG. 8 is a schematic view illustrating cross-sections of parts of a liquid crystal display device 203 and a liquid crystal module 103 according to the present embodiment. FIG. 9A is a schematic plan view of a part of the liquid crystal module 103, and FIG. 9B is a schematic plan view of the liquid crystal module 103 before the control device 50 is supported on the TFT substrate 11. The liquid crystal display device 203 and the liquid crystal module 103 of the present embodiment are different from the liquid crystal display device 201 and the liquid crystal module 101 of the first embodiment in that a source driver 14 is mounted on the flexible circuit substrate 60 instead of the TFT substrate 11.

The flexible circuit substrate 60 has a main surface 60a and a main surface 60b located on an opposite side of the main surface 60a, the source driver 14 is mounted on the main surface 60b, and the source driver 14 is electrically coupled to the flexible circuit substrate 60.

Since the source driver 14 is not disposed in the mounting region 12m, interference between the source driver 14 and the rigid substrate 51 of the control device 50 is prevented, and a height of the coupling member 70 can be reduced. Accordingly, a position of the rigid substrate 51 in the height direction can be lowered, and a thickness of a display device can be reduced.

Other Aspects

The liquid crystal display device and the liquid crystal module of the present disclosure are not limited to the above-described embodiments, and various modifications can be made therefrom. For example, the liquid crystal module of the present disclosure may be a liquid crystal module having various structures and drive methods. In addition, also in the second embodiment and the third embodiment, the first end 60c of the flexible circuit substrate 60 may be coupled to the main surface 51b of the rigid substrate 51, that is, a surface of the rigid substrate 51 opposite to a surface facing the TFT substrate 11. In addition, in each embodiment, the timing controller 52 may be mounted on the main surface 51a or the main surface 51b.

The liquid crystal module of the present disclosure can also be described as follows.

A liquid crystal module according to a first configuration includes a liquid crystal display panel including a TFT substrate having a main surface including a display region and a non-display region located around the display region and including a plurality of pixels arranged two-dimensionally in the display region, a counter substrate disposed to face the main surface of the TFT substrate, and a liquid crystal layer disposed between the TFT substrate and the counter substrate, a control device that includes a rigid substrate having a first side and a second side and includes a timing controller mounted on the rigid substrate, and a flexible circuit substrate that has a first end, which is coupled to a vicinity of the first side of the rigid substrate, and a second end and protrudes outside the rigid substrate, the TFT substrate has a third side and a mounting region that is adjacent to the third side in the non-display region and not covered with the counter substrate, the second end of the flexible circuit substrate is coupled to a vicinity of the third side in the mounting region of the TFT substrate, the flexible circuit substrate is bent between the first end and the second end, and a vicinity of the second side of the rigid substrate is supported on the mounting region.

According to the first configuration, a space above the mounting region is used for disposing the control device, and thus, a liquid crystal module, in which a picture-frame of a display device is narrow and a thickness of the display device can be reduced, can be realized.

According to the first configuration, in the liquid crystal module of a second configuration, the rigid substrate may be coupled to the TFT substrate at a position farther from the third side than a position to which the second end of the flexible circuit substrate is coupled.

According to the first configuration, in the liquid crystal module of a third configuration, the first end of the flexible circuit substrate may be coupled to a surface of the rigid substrate facing the TFT substrate.

According to the first configuration, in the liquid crystal module of a fourth configuration, the first end of the flexible circuit substrate may be coupled to a surface of the rigid substrate opposite to a surface facing the TFT substrate.

According to the first configuration, in the liquid crystal module of a fifth configuration, the liquid crystal display panel may further include at least one source driver mounted on the mounting region, and a coupling member that is located between the TFT substrate and the rigid substrate in the mounting region and has a height greater than a height of the source driver.

According to the first configuration, in the liquid crystal module of a sixth configuration, the liquid crystal display panel may further include at least one source driver mounted on the mounting region, the rigid substrate may have at least one opening or at least one notch provided on a second side, and a part of the at least one source driver may be inserted into the at least one opening or the at least one notch. Thereby, interference between the source driver and the rigid substrate can be prevented.

According to the first configuration, in the liquid crystal module of a seventh configuration may further include at least one source driver supported by and electrically coupled to the flexible circuit substrate. Thereby, interference between the source driver and the rigid substrate can be prevented.

The present disclosure contains subject matter related to that disclosed in Japanese Priority Patent Application JP 2023-014280 filed in the Japan Patent Office on Feb. 1, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal module comprising:
   a liquid crystal display panel that includes:
      a thin-film transistor (TFT) substrate having a main surface including a display region and a non-display region located around the display region and including a plurality of pixels arranged two-dimensionally in the display region,
      a counter substrate disposed to face the main surface of the TFT substrate, and
      a liquid crystal layer disposed between the TFT substrate and the counter substrate;
   a control device that includes a rigid substrate having a first side and a second side facing each other and having no flexibility and includes a timing controller mounted on the rigid substrate; and
   a flexible circuit substrate that has a first end and a second end, has flexibility, and protrudes outside the rigid substrate, the first end being coupled to a vicinity of the first side of the rigid substrate, wherein
   the TFT substrate has a third side and a mounting region that is adjacent to the third side in the non-display region and that is not covered with the counter substrate,
   the second end of the flexible circuit substrate is coupled to a vicinity of the third side in the mounting region of the TFT substrate,
   the flexible circuit substrate is bent between the first end and the second end,
   a vicinity of the second side of the rigid substrate is supported by the mounting region, and
   the rigid substrate is coupled to the TFT substrate, through a coupling member, at a position farther from the third side than a position at which the second end of the flexible circuit substrate is coupled.

2. The liquid crystal module according to claim 1, wherein the first end of the flexible circuit substrate is coupled to a surface of the rigid substrate facing the TFT substrate.

3. The liquid crystal module according to claim 1, wherein the first end of the flexible circuit substrate is coupled to a surface of the rigid substrate opposite to a surface facing the TFT substrate.

4. The liquid crystal module according to claim 1, further comprising:
   at least one source driver supported by and electrically coupled to the flexible circuit substrate.

5. A liquid crystal module comprising:
   a liquid crystal display panel that includes:
      a thin-film transistor (TFT) substrate having a main surface including a display region and a non-display region located around the display region and including a plurality of pixels arranged two-dimensionally in the display region,
      a counter substrate disposed to face the main surface of the TFT substrate, and
      a liquid crystal layer disposed between the TFT substrate and the counter substrate;
   a control device that includes a rigid substrate having a first side and a second side facing each other and having no flexibility and includes a timing controller mounted on the rigid substrate; and
   a flexible circuit substrate that has a first end and a second end, has flexibility, and protrudes outside the rigid substrate, the first end being coupled to a vicinity of the first side of the rigid substrate, wherein
   the TFT substrate has a third side and a mounting region that is adjacent to the third side in the non-display region and that is not covered with the counter substrate,
   the second end of the flexible circuit substrate is coupled to a vicinity of the third side in the mounting region of the TFT substrate,
   the flexible circuit substrate is bent between the first end and the second end,
   a vicinity of the second side of the rigid substrate is supported by the mounting region, and
   the liquid crystal display panel further includes:
      at least one source driver mounted on the mounting region, and
      a coupling member that is located between the TFT substrate and the rigid substrate in the mounting region and that has a height greater than a height of the at least one source driver.

6. A liquid crystal module comprising:
   a liquid crystal display panel that includes:
      a thin-film transistor (TFT) substrate having a main surface including a display region and a non-display region located around the display region and including a plurality of pixels arranged two-dimensionally in the display region,
a counter substrate disposed to face the main surface of the TFT substrate, and
a liquid crystal layer disposed between the TFT substrate and the counter substrate;
a control device that includes a rigid substrate having a first side and a second side facing each other and having no flexibility and includes a timing controller mounted on the rigid substrate; and
a flexible circuit substrate that has a first end and a second end, has flexibility, and protrudes outside the rigid substrate, the first end being coupled to a vicinity of the first side of the rigid substrate, wherein
the TFT substrate has a third side and a mounting region that is adjacent to the third side in the non-display region and that is not covered with the counter substrate,
the second end of the flexible circuit substrate is coupled to a vicinity of the third side in the mounting region of the TFT substrate,
the flexible circuit substrate is bent between the first end and the second end,
a vicinity of the second side of the rigid substrate is supported by the mounting region,
the liquid crystal display panel further includes at least one source driver mounted on the mounting region,
the rigid substrate has at least one opening or at least one notch provided on the second side, and
a part of the at least one source driver is inserted into the at least one opening or the at least one notch.

* * * * *